Figure 8:
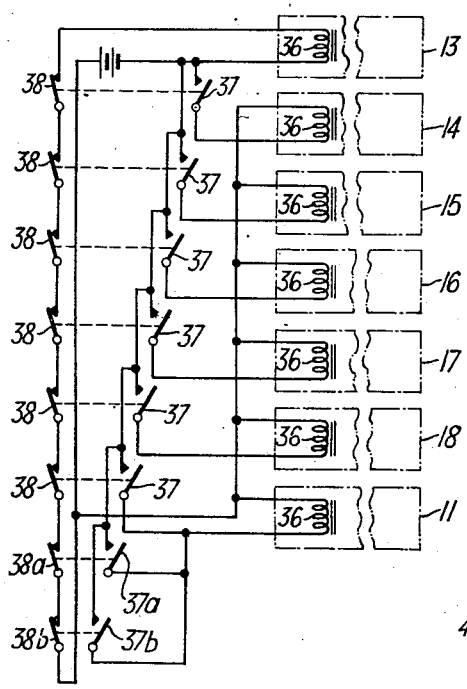

Oct. 29, 1957  R. N. PIPER ET AL  2,811,309
STATISTICAL MACHINES
Filed March 16, 1956  5 Sheets-Sheet 1
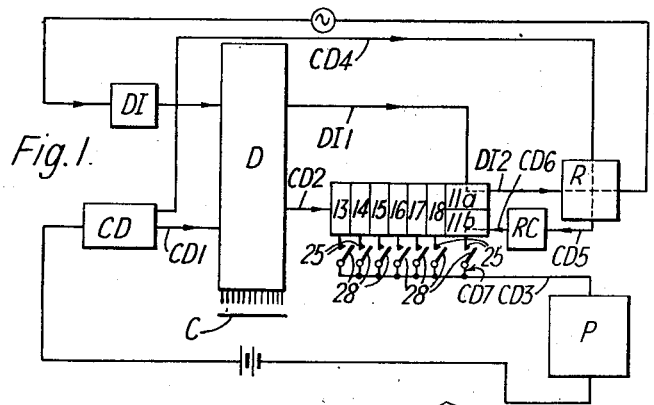
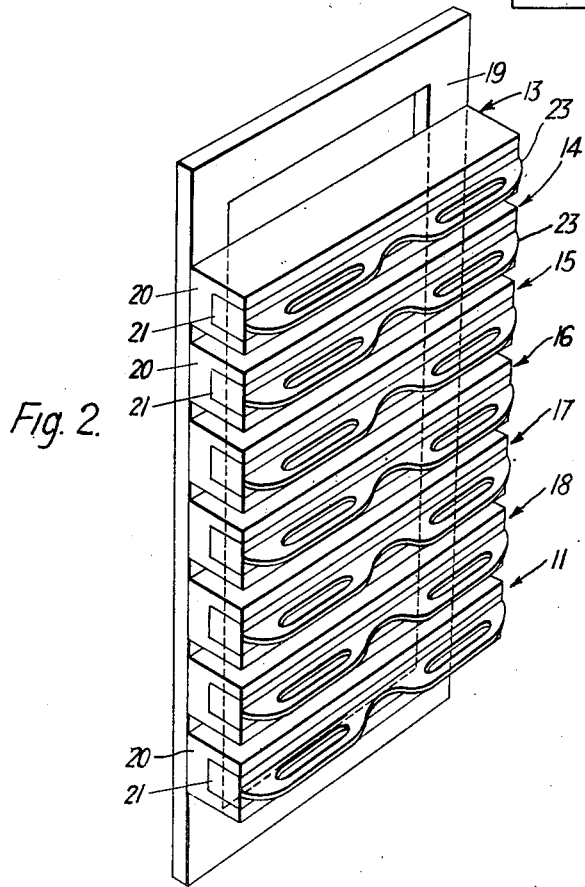
Inventor
Ronald N. Piper & Eric Dawson
By
Attorney

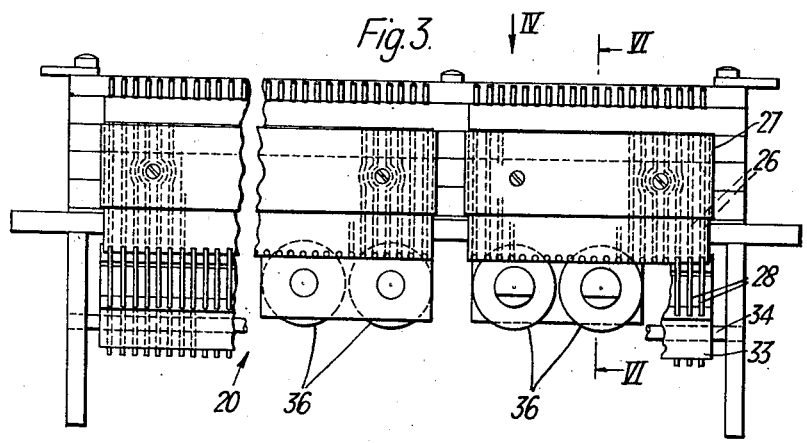
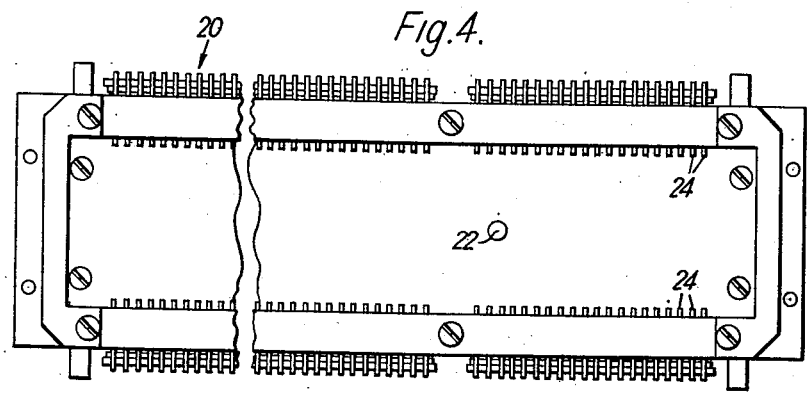
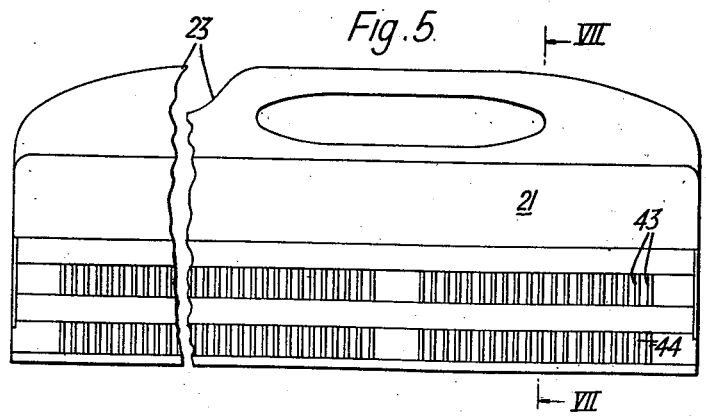

Oct. 29, 1957 R. N. PIPER ET AL 2,811,309
STATISTICAL MACHINES
Filed March 16, 1956 5 Sheets-Sheet 3

Inventor
Ronald N. Piper & Eric Dawson
By
Attorneys

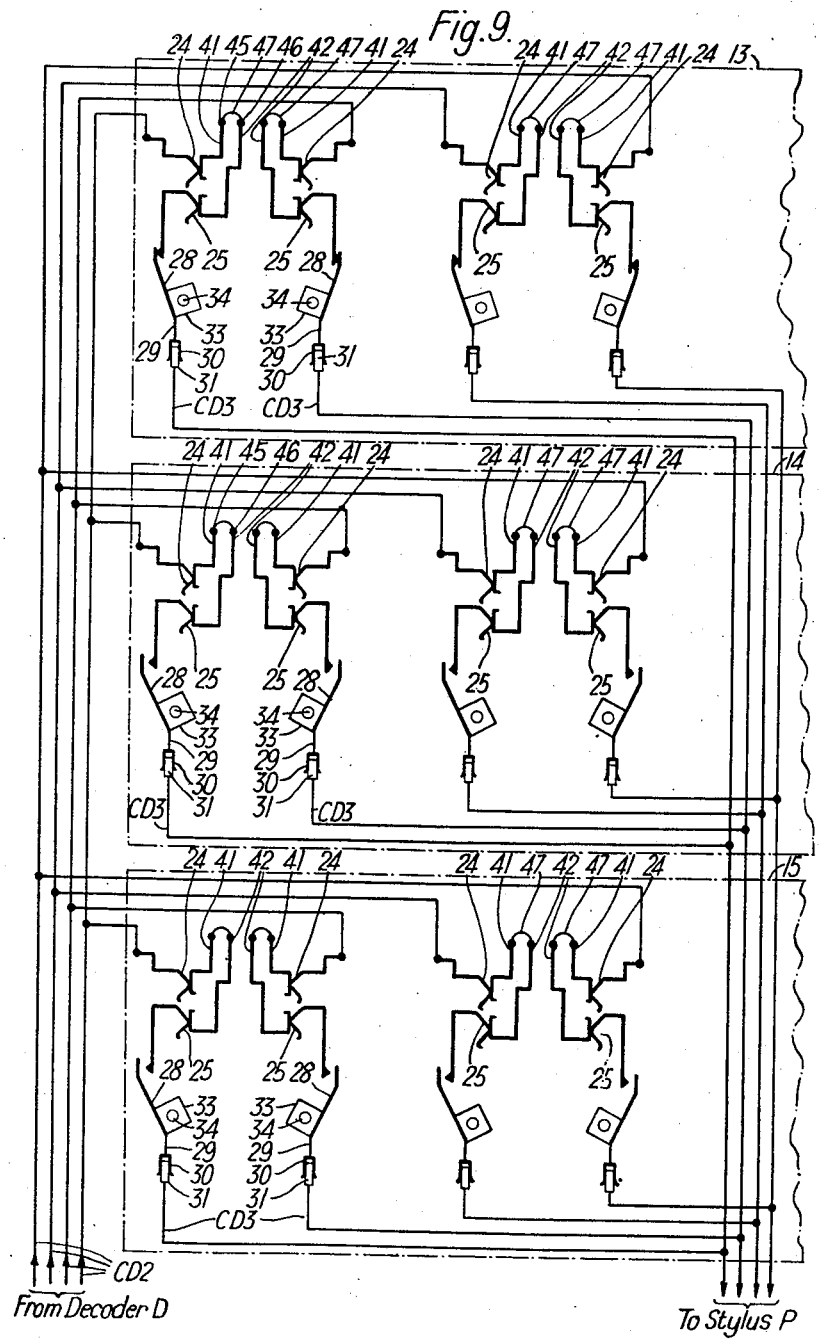

Oct. 29, 1957  R. N. PIPER ET AL  2,811,309
STATISTICAL MACHINES
Filed March 16, 1956  5 Sheets-Sheet 5

Inventor
RONALD N. PIPER & ERIC DAWSON
By

United States Patent Office 2,811,309
Patented Oct. 29, 1957

2,811,309

STATISTICAL MACHINES

Ronald Newman Piper, Epsom, and Eric Dawson, Carshalton Beeches, England, assignors to Powers-Samas Accounting Machines Limited, London, England, a British company Application March 16, 1956, Serial No. 572,148

Claims priority, application Great Britain April 28, 1955

4 Claims. (Cl. 235—61.9)

This invention relates to record controlled statistical machines and in particular to a connection box unit for use therewith to control the definition of characters on impression-receiving material and/or the control of accumulator devices embodied in the machine.

As is well understood statistical machines are controlled by records, such as cards or tapes, and often include devices for effecting on impression-receiving material, such as paper, a permanent record of data sensed from the records and/or a permanent record of an amount read-out from an accumulator or accumulators embodied in the machine. Many kinds of devices are known for effecting imprinting of the said permanent record and some such devices include for each imprinting position a single stylus and others include for each imprinting position a plurality of dot-forming elements, actuation of the styluses or of the dot-forming elements being at least in part controlled by electrical control circuits appropriated thereto.

The data which is permanently recorded is often required, in successive lines, to be printed in different relative positions across the impression-receiving material and devices such as wire-containing connection boxes are well known for performing this function, particularly for the imprinting for example of a four-line name and address, the details of which may be sensed from a plurality of successive cards, one for each line, or from a single card in which the details for each line are recorded in different fields of the card. With the previously known devices, however, there are limits to the number of different positions in which data can be imprinted across the impression receiving material due to the fact that all inputs to the imprinting device must be transmitted through a single set of control elements of which one is appropriated to each imprinting position.

It is a main object of the present invention to provide a connection box unit the construction of which is such that data sensed from a record during successive sensing cycles may be imprinted in any desired predetermined position across the impression-receiving material irrespective of whether the data sensed in a preceding cycle or cycles is located in the same position or is contained in a different field of the record.

Figure 7:
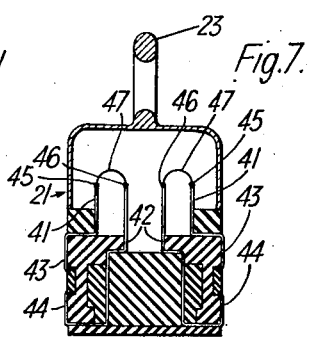
Figure 6:
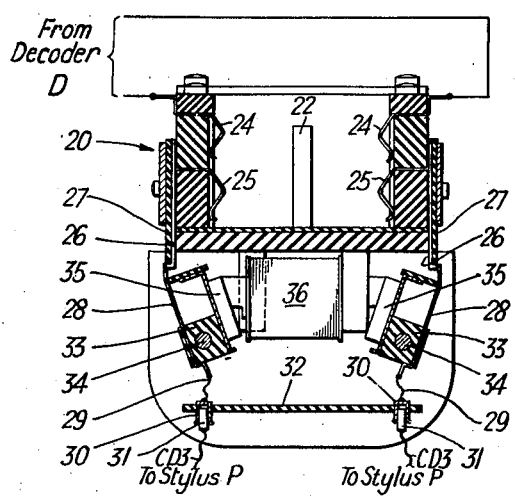
Figure 10:
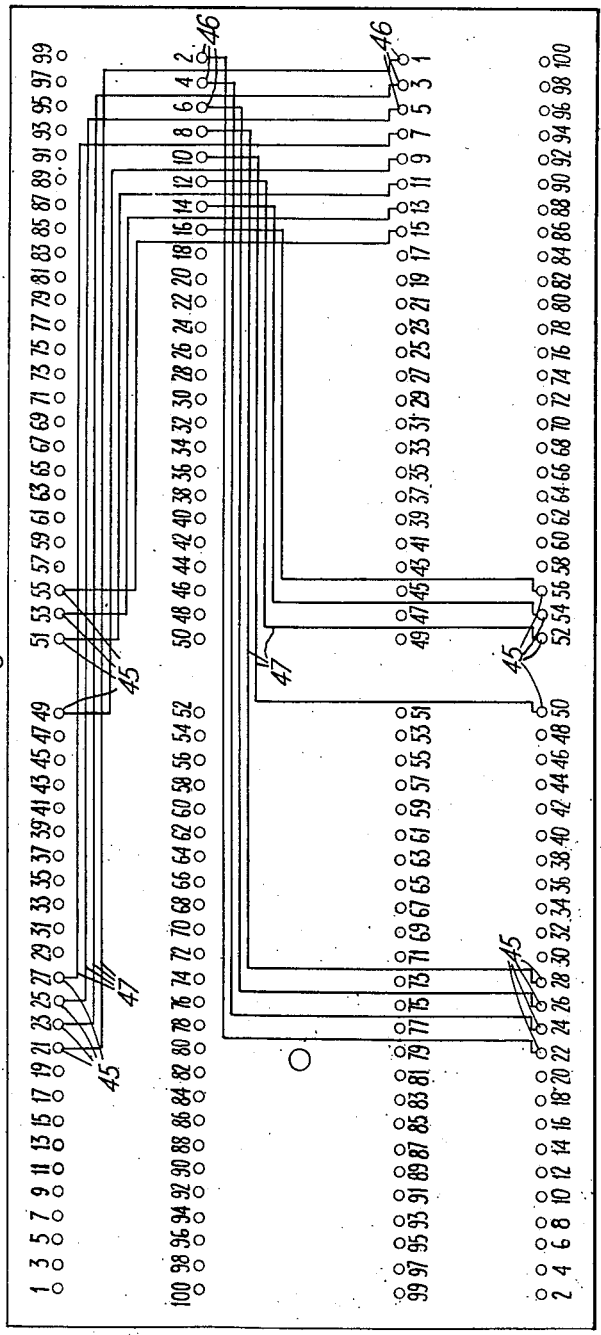

In order that the invention may be clearly understood one embodiment thereof will now be described, by way of example, with reference to the accompanying drawings in which:

Figure 1 is a block diagram of a statistical machine embodying the present invention, Figure 2 is a pictorial view in elevation of a connection box unit according to the invention, Figure 3 is a broken top plan of a socket forming part of the connection box unit, Figure 4 is a view looking in the direction of arrow IV, Figure 3, Figure 5 is a broken top plan of a plug for co-operation with the socket shown in Figures 3 and 4, Figure 6 is a section on line VI—VI, Figure 3, Figure 7 is a section on line VII—VII, Figure 5, Figure 8 is a circuit diagram showing the switching arrangement by which sockets are rendered active or inactive, Figure 9 is a circuit diagram of a part of the connection box unit, and Figure 10 is a circuit diagram illustrating the manner in which contacts in a plug for use with a socket are connected.

Referring to Figure 1, data sensed, in known manner, from a card C is fed into a decoding device D, of known construction, which co-operates electrically with a unit containing a plurality of character-defining discs CD, also of known construction, and with a device DI arranged to feed digit-representing impulses into the decoding device. If the data sensed from a card C consists wholly or in part of figures to be entered into an accumulator R, the device DI is arranged to feed the appropriate number of digit-representing pulses to the decoder D from which they pass along a line DI1 to a connection box 11a, forming part of the connection box unit, and thence along a line DI2 to the accumulator R. If a permanent record of the figures entered into the accumulator R is simultaneously to be made, or if the data to be imprinted consists of characters of the alphabet, or of special characters such as + or &, impulses, as appropriate, will pass along a line CD1 to decoder D and thence along a line CD2. The character-defining impulses will pass from a connection box 13, 14, 15, 16, 17, 18 described below, as selected by switches 37, Figure 8, along a line CD3 Figures 1, 6 and 9 also described below, to the actuating solenoid, not shown, of a stylus, also not shown, forming part of the imprinting device P. The stylus just mentioned is not shown as the mode of operation thereof is known in the art, the marking end of the stylus being, as described in United States patent specification No. 2,674,652, W. E. Johnson et al., dated April 6, 1954, arranged for continuous reciprocation transversely to the direction of movement of a continuously moving paper web. The amplitude of reciprocation of the marking end of a stylus defines the maximum width of a character and the rate at which the web of paper is moved defines the height of the character, and the stylus receives, through its moving coil solenoid, impulses which reciprocate it lengthwise to effect the formation of a dot pattern on the paper thereby to define a character under control of a character-defining disc contained in the unit CD.

If the imprinting operation is a reading-out operation from the accumulator R, then the impulses from the character-defining discs in unit CD pass along lines CD4, CD5 through a read-out control switch RC and along line CD6, through a connection box 11b, and line CD7 and CD3.

All the impulses transmitted through the connection boxes 13, 14, 15, 16, 17 and 18, however, are passed along line CD1, CD2 and CD3 to control operations of the imprinting device.

Referring to Figures 2 to 7 of the drawings, the connection box unit comprises a frame 19, Figure 2, to which each of the connection boxes 11 and 13 to 18 are secured. The construction of each connection box is shown in greater detail in Figures 3 to 7 and consists of a socket 20 into which is fitted a plug 21 to be removable therefrom so that it can, on removal from the socket, be replaced by another plug having different connections as will be described below. The plug is provided with locating apertures, not shown, which co-operate with pins 22, Figures 4 and 6, to locate it in position relative to the socket. Handles 23 are provided on the plug to facilitate the insertion thereof into the socket and its removal therefrom.

The socket, which is retained in fixed position on the frame 19, by screws or any other suitable means, includes electrically conductive elements for each imprinting position of which there may be any predetermined number, the number for the purposes of illustration herein being one hundred, as can be seen from Figure 10. Each of the electrically conductive elements for the said one hundred positions comprises a first electrical contact member 24, Figures 6 and 9, and a second electrical contact member 25 suitably insulated one from the other. The inputs from the decoder D are received by the contact members 24, but unless eelctrical connection between the contacts 24 and 25 of a pair thereof is effected by the plug, it will be understood that the input will not be transmitted to the output line CD3 connected therewith. The contact members 25 are electrically connected with a line 26, Figure 6, of electrically conductive material printed on a piece of electrically insulating material 27 and connection between the printed lines 26 and the output line CD3 appropriated thereto is effected by a switch element 28 of electrically conductive material to which is connected a lead 29, Figure 6, which, in turn, is connected to the female portion 30 of a jack, the plug portion 31 of which is connected to the line CD3. The jacks are supported relative to the socket by a tag board 32.

The switches 28, which, as can be seen from Figure 3, consist of narrow strips of electrically conductive material, are supported by a carrier 33 made of insulating material and supported by a rocking spindle 34. The switches 28, by rocking of their carrier 33, are arranged to make and break electrical connection between the conductive lines 26 and the lines CD3, the leads 29 being sufficiently flexible to accommodate the rocking movement of the carrier 33. The carrier 33 also supports an armature plate 35 for co-operation with a solenoid 36 which, when energized, rocks the carrier 33 so that the switch elements 28 co-operate wtih their conductive lines 26, as shown in Figure 6, and the socket is thereby rendered active. When the solenoid 36 is deenergized the carrier is rocked about the axis of its spindle 34 by means of a spring, not shown, to disengage the switch elements 28 from the conductive strips 26 with which they co-operate thereby rendering the socket inactive.

Figure 9 illustrates a part of the electrical circuits controlled by the sockets for the connection boxes 13, 14, and 15, it being understood that the remaining connection boxes of the connection box unit are similarly incorporated in the circuit. From Figure 9 it will be seen that like contact members 24 in the respective connection boxes are connected in common with the line CD2 appropriated thereto and which is arranged to transmit an input from a particular position in the decoder D according to the sensing of the card C. Like contacts 25 in the sockets are connectable in common through their switches 28 and jacks 30, 31 to a predetermined one of the lines CD3 which line, as stated above, is arranged in part to control operation of a predetermined stylus.

From Figure 9 it will be seen that the switch elements 28 for socket 13 are in the closed position thereof whereas the switch elements 28 for the remaining sockets 11, 14, 15, 16, 17, 18 are in the open condition thereof and the arrangement is such that the switch element 28 for only one socket can at any one time be arranged to render its socket active. The means whereby this mode of operation is ensured is illustrated by the circuit shown in Figure 8 which illustrates the manner in which energization of the solenoids 36 is controlled.

In the connection box unit herein described it is assumed that the connection box 13 is normally in the active condition thereof and the remaining six connection boxes of the unit are in their inactive conditions.

Accordingly, as can be seen from Figure 8 the solenoid 36 is normally energized, but will be de-energized to render the socket of connection box 13 inactive when any one of the switches 37 is closed because, simultaneously with the closing of switch 37 a switch 38 in the circuit for the solenoid 36 of the socket of connection box 13 is opened.

Referring particularly to Figures 5, 7, and 9, the plug 21 for co-operation with a socket 20 includes a contact element for each conductive element of a socket. Each of the contact elements consists of two contact strips 41, 42 having respectively a first portion 43 to engage with a first contact member 24 and a second portion 44 to engage with the second contact member 25 which forms a pair with the first contact member 24. The ends 45, 46 of the contact strips 41, 42 are connected by an electrical connecting member 47 which may be a flexible electrically conducting wire.

Referring to Figure 10 this figure diagrammatically illustrates the one hundred ends 45 and the one hundred ends 46 and it will be understood that, if desired, ends 45 may be connected with like numbered ends 46 by the connecting elements 47. Usually, however, in the plugs for the connection boxes 11, 15, 16, 17 and 18 it will be required to connect unlike numbered ends in order to determine the positions at which imprinting will be effected. In Figure 10, it has been assumed that the ends 45 in a field containing positions 21 to 28 are required to be connected to the ends 46 in a field containing positions 1 to 8, and the ends 45 in a field containing positions 49 to 56 are required to be connected to the ends 46 in a field containing positions 9 to 16. It will, of course, be understood that any of the ends 45 can be connected to any of the ends 46 according to the positions at which imprinting is to be effected.

The connection box unit illustrated in Figure 2 is arranged to effect imprinting, on forms, of data which includes a four-line name and address to be succeeded by a plurality of lines of itemized information. Imprinting of the four-line name and address is controlled by the connection boxes 15, 16, 17 and 18 and the itemized information is controlled by the connection boxes 13 and 14, of which the connection box 13 controls the imprinting of data sensed from normal row positions of a card and the connection box 14 controls the imprinting of information from interstage row positions of a card. The connection box 11 controls the imprinting of amounts sensed from a card and also controls the entry of the amounts into the accumulator R, Figure 1; and when rendered active by programme or record controlled switches 37a, 38a and 37b, 38b, Figure 8, controls the taking respectively of a sub-total or of a grand-total and the imprinting thereof.

During the operation of the machine the switches 37, 38 are selectively controlled by cams contained in a programme unit forming no part of the present invention and which, when a name and address card is fed to the sensing position operates in succession the switches 37, 38 for connection boxes 15, 16, 17 and 18, each of these boxes being rendered active during different sensing cycles while a card is retained in sensing position first to be sensed in two card fields in the normal row positions thereof and then to be sensed in two card fields in the interstage row positions thereof. During the sensing of the two normal field positions the connection boxes 15 and 16 are active in succession and during the sensing of the interstage field positions the connection boxes 17 and 18 are operated in succession. Thus, although during each of the four sensing cycles the whole of the card is sensed, the plugs 21 for the connection boxes 15, 16, 17 and 18 determine the card fields from which data is transmitted for imprinting and they also determine the location of the four successive lines relative one to the other. Thus, the first letter of each row of the name and address may be aligned one beneath the other, or the first letters of the four lines of the name and address may be inset with respect to one another by any desired amount according as to the manner in which the connecting elements 47 are connected between the ends 45 and the ends 46.

After the name and address has been imprinted from the name and address card there will be a succession of detail cards bearing information to be imprinted in successive lines below the name and address and such information may be contained anywhere on the card either in normal row positions and/or in interstage row positions thereof. The imprinting of this detail information is controlled by the connection boxes 13 and 14, the box 13 controlling the imprinting of information sensed in normal row positions and the box 14 controlling the imprinting of data sensed from interstage row positions. Thus, if a card has two lines of data recorded thereon, one line of data will be recorded in normal row positions, and during the first sensing operation on the card the imprinting of the data sensed from the normal row positions will be controlled by the connection box 13 and during a second sensing operation performed on the card the imprinting operation will be controlled by the connection box 14. It will be understood that the order of operation of the connection boxes through the switches 37, 38 is, as stated above, controlled by the above mentioned programme unit.

It will also be understood that, if desired, instead of providing four connection boxes 15, 16, 17, and 18 to control the imprinting of a four-line name and address, only two such boxes need be provided, in which case one of the boxes will be arranged to control the imprinting resulting from the sensing in the same field of normal and interstage row positions of a card and the second connection box will be employed, to control the imprinting of data sensed from a second field in both normal and interstage row positions. With this arrangement the two connections boxes will be used alternately first in connection with data sensed from normal row positions and then in connection with data sensed from interstage row positions.

By arranging as illustrated in Figure 3, that the switch elements are not all supported by a single carrier 33, but are supported by a plurality of such carriers, each independently operable by a solenoid 36 appropriated thereto, it will be readily understood that selective operation of the independent carriers by their solenoids 36, through switches 37, 38 appropriated thereto, can be employed to obtain any desired sequence of operations as determined by the programme control unit.

From the foregoing description it will be understood that by the present invention there is provided a compact connection box unit whereby there is made available a plurality of complete sets 20 of fixed imprinting control elements 24, 25, 30, 31 each appropriated to a predetermined imprinting device to control operation thereof and that like control elements are connected in common so that by the cooperation therewith of connection members 21 having connection elements 43, 44 connected in predetermined order for cooperation with the control devices 24, 25, 30, 31 of the control element with which it cooperates any desired imprinting elements can be controlled as the result of different sensing operations performed on a record thereby increasing the capacity of the connection box unit as compared with units known prior to the invention.

We claim:

1. A connection box unit for a record controlled statistical machine which includes for each of a plurality of imprinting positions at least one character-defining element to define characters on impression-receiving material and in which actuation of the character-defining element or elements for each imprinting position is at least in part controlled by an electrical control circuit appropriated thereto, said unit comprising a plurality of sockets each of which includes electrically conductive elements comprising for each imprinting position a first and a second electrical contact member insulated one from the other, said first contact member being arranged for electrical connection with a predetermined position of a data-decoding unit and the second contact member being arranged for connection through the switch element appropriated thereto with the control circuit for the character-defining element appropriated thereto, a common electrical connection for like conductive elements of each of the sockets, a plug co-operable with and individual to each said socket and arranged to be removable from its socket for replacement by another plug, each plug having a contact element for each conductive element of its socket and electrical conducting elements to connect predetermined contact elements with predetermined conductive elements of its socket, at least one switch element for each socket to make and break electrical connection between its conductive elements and the control circuits connectable therewith, and an electrically operated actuator for each said switch element, the actuators for the respective sockets being connected through switches selectively operable to ensure that at any time only one actuator is operated to render active the switch element controlled thereby.

2. A unit according to claim 1, wherein each switch comprises an electrically conductive strip supported by a pivoted carrier therefor made of insulating material and rockable about its pivot by the actuator therefor to move the strip into and out of electrical cooperation with the second contact member apropriated thereto.

3. A unit according to claim 2, wherein the plug is insertable into said socket and includes contact strips to effect electrical connection between selected pairs of said first and second contact members.

4. A connection box unit for a record controlled statistical machine which includes for each of a plurality of imprinting positions at least one character-defining element to define characters on impression-receiving material and in which actuation of the character-defining element or elements for each imprinting position is at least in part controlled by an electrical control circuit appropriated thereto, said unit comprising a plurality of sockets each including for each imprinting position a first and a second electrical contact member insulated one from the other, a switch element for each pair of said first and second contact members, at least one pivoted carrier for the switch elements of each socket, an electrically operated actuator for each said carrier, said actuators being selectively operable to ensure that at any time only one actuator is operated to render active the switch elements controlled thereby, said first contact member being arranged for electrical connection with a predetermined position of a data-decoding unit and the second contact member being arranged for connection through the switch element appropriated thereto with the control circuit for the character-defining element appropriated thereto, and a plug co-operable with and individual to each said socket and arranged to be removable from its socket for replacement by another plug, each said plug including electrically connected contact strips to effect connection between predetermined pairs of contact members of the socket into which it is inserted.

References Cited in the file of this patent

UNITED STATES PATENTS 2,569,879    Balde  ---------------- Oct. 2, 1951